United States Patent
Köhne

(10) Patent No.: US 7,708,934 B2
(45) Date of Patent: May 4, 2010

(54) METHOD FOR PRODUCING A PRECURSOR CERAMIC

(75) Inventor: Martin Köhne, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 1021 days.

(21) Appl. No.: 10/563,663

(22) PCT Filed: May 12, 2004

(86) PCT No.: PCT/DE2004/000987

§ 371 (c)(1), (2), (4) Date: May 18, 2006

(87) PCT Pub. No.: WO2005/014503

PCT Pub. Date: Feb. 17, 2005

(65) Prior Publication Data

US 2006/0239896 A1 Oct. 26, 2006

(30) Foreign Application Priority Data

Jul. 25, 2003 (DE) ................. 103 33 961

(51) Int. Cl.
C04B 35/80 (2006.01)
(52) U.S. Cl. ...................... 264/624; 264/674
(58) Field of Classification Search .......... 264/624, 264/674

See application file for complete search history.

(56) References Cited

U.S. PATENT DOCUMENTS

2002/0079623 A1 * 6/2002 Petrak .................. 264/624
2003/0134736 A1   7/2003 Keller

FOREIGN PATENT DOCUMENTS

| EP | 0 412 428 | 11/1994 |
| JP | 5070227 | 3/1993 |
| WO | WO 98/41548 | 9/1998 |
| WO | WO 01/92381 | 12/2001 |
| WO | WO 02/18296 | 3/2002 |

OTHER PUBLICATIONS

Dae-Soon, Lim et al.: "Effect of carbon nanotube addition on the tribological behavior of carbon/carbon composites" Wear Elsevier Netherlands, Bd. 252, Nr. 5-6, pp. 512-517.

Kay Hyeok An et al.: "Electrochemical Properties of High-Power Supercapacitors Using Single-Walled Carbon Nanotube Electrodes" Advanced Functional Materials, Wiley Intersciences, Wienheim, DE, Bd. 11, Nr. 5, Oct. 2001, pp. 387-392.

* cited by examiner

*Primary Examiner*—Carlos Lopez
*Assistant Examiner*—Russell J Kemmerle, III
(74) *Attorney, Agent, or Firm*—Kenyon & Kenyon LLP

(57) ABSTRACT

In a method for manufacturing a precursor ceramic by pyrolysis of elementorganic precursor polymers, carbon nanotubes are bonded to the precursor ceramic and the bonding is performed in such a way that the quantity of free carbon forming in the decomposition of the elementorganic precursor polymers is adjusted in such a way that there is a stoichiometric or moderately hypostoichiometric carbon concentration in the precursor ceramic.

9 Claims, No Drawings

METHOD FOR PRODUCING A PRECURSOR CERAMIC

FIELD OF THE INVENTION

The present invention relates to a method for manufacturing a precursor ceramic.

BACKGROUND INFORMATION

In the manufacture of ceramic sheathed-element glow plugs from ceramic composite materials, amorphous SiOC ceramics (precursor ceramics) are obtained by the pyrolysis of elementorganic precursors. Advantages of this precursor-thermolysis method in comparison with conventional manufacturing methods for ceramics (e.g., sintering) are the considerably lower process temperatures and the easy workability and malleability of the elementorganic precursors such as polysiloxane resins for example.

To manufacture stable ceramic bodies from organic silicon polymers, temperatures of approximately 800° C. already suffice, while sintering powder for the most part only yields mechanically stable bodies at sintering temperatures above 1200° C. Thus the manufacture of ceramic solids from filled organic silicon polymers requires considerably lower temperatures than the sintering of ceramic powders. Such a method is known from published European patent document EP 0 412 428, for example. In this instance, a metallic filler, which reacts with the decomposition products resulting in the pyrolysis of the polymer compounds, is admixed to the starting polymers. Pyrolysis takes place at a temperature in the range of 600 to 1800° C. and frequently in an inert-gas atmosphere. Filler components used, among others, are, e.g., chromium, molybdenum, silicon and intermetallic compounds of representatives of the fourth to sixth subgroup of the periodic system with boron, silicon or aluminum. These fillers are required since otherwise shrinkage cracks and an excessive number of pores are formed during pyrolysis. With the aid of these fillers it is possible to set in a precise manner certain properties such as, e.g., the coefficient of thermal expansion, thermal conductivity or the specific electrical resistance of the composite.

In the manufacture of a ceramic composite material from a precursor ceramic, in which, for example, a polysiloxane, i.e., a polymer on the basis of Si, C, O and H, is used, it is therefore possible by selecting the appropriate fillers to precisely tailor the electrical or physical property profile of the ceramic composite material resulting from the pyrolysis to the respective requirement profile, e.g., of a ceramic sheathed-element glow plug. In particular, it is possible in this manner to set the electrical conductivity from very conductive to insulating.

The mechanical properties of precursor ceramics (e.g., bending strength<350 MPa, fracture toughness $K_{Ic}$<MPa $\sqrt{m}$), however, can be improved only to a limited extent by fillers that have a low aspect ratio, i.e., a low aspect ratio between the length and the diameter of <5. Fillers having a high aspect ratio of >10, such as fibers for example, offer considerably better results.

Due to gaseous decomposition products formed during pyrolysis, the precursor ceramic is porous. The size of the pores lies in the range of approximately 300 to approximately 800 nm. The bonding of whiskers, typically having a diameter of approx. 1 µm and lengths of approx. 100 µm, and fibers to the precursor ceramic is deteriorated by these pores since the pores reduce the effective whisker-fiber surface adhering in the precursor ceramic. The reinforcing effect of whiskers and fibers in components made of precursor ceramic is thereby reduced. The use of carbon nanotubes/fibers for reinforcing precursor ceramics offers advantages due to the considerably smaller dimensions at the same aspect ratio. Typical dimensions of carbon nanotubes are diameters of approximately 20 to approximately 120 nm and a length of approximately 0.5 to approximately 200 µm. In addition, carbon nanotubes are very insensitive to mechanical stresses in manufacturing (e.g., mixing, kneading, grinding, sifting) the composite made of the elementorganic precursor, fillers and the carbon nanotubes, since in a breakup of the carbon nanotubes, e.g., a bisection, the aspect ratio is still large enough.

Due to their outstanding properties, carbon nanotubes as fiber reinforcement in composite materials are of great interest and are already used in plastic composites and sinter ceramics.

Published International patent document WO 01/92381, for example, describes a method for forming a composite material from embedded nanofibers in a polymer matrix. The method comprises the introduction of nanofibers into a plastic matrix with the formation of agglomerates and the uniform distribution of the nanofibers by exposing the agglomerates to hydrodynamic stresses. Likewise disclosed is a nanofiber-reinforced polymer composite system, which has a plurality of nanofibers embedded in polymer matrices. A method for manufacturing fibers reinforced by nanotubes comprises the admixture of a nanofiber into a polymer and inducing an orientation of the nanofiber, which allows the latter to be used to improve the mechanical, thermal and electrical properties.

Published International patent document WO 02/18296 discloses a ceramic matrix-nano-composite material having improved mechanical properties. This is made up of a filler made of carbon nanotubes and a ceramic matrix which is fabricated from a nano-crystalline ceramic oxide. By sintering the article formed from this, it is possible to obtain ceramic materials of improved fracture toughness.

The properties of carbon nanotubes of the type MWNT (multiwall carbon nanotubes) are as follows:

Thermal conductivity: >2000 W/mK
Tensile strength: >10 GPa
Young's modulus: up to 1200 GPa
Electric conductivity: Semiconductor or metallic
Aspect ratio: 100-1000

The number of manufacturers of carbon nanotubes is steadily increasing. Commercial production at over 100 t/year has been achieved in the meantime, which results in markedly falling prices for such carbon nanotubes.

An objective of the present invention is to provide a method to improve the properties of composite materials made from precursor ceramics.

SUMMARY

The method according to the present invention for manufacturing ceramic composite materials from elementorganic precursor polymers has the advantage over the related art in that the properties of the manufactured composite materials can be markedly improved.

It is furthermore advantageous that in contrast to the conventional use of fibers or whiskers, there is no degradation of the structural fineness.

DETAILED DESCRIPTION

With the use of carbon nanotubes it is possible to improve ceramics made of precursor ceramic with respect to their strength, impact strength, electric and thermal conductivity. In this connection, the quality of the bonding of the carbon nanotubes to the precursor ceramic is decisive for the reinforcing effect of the carbon nanotubes. Without an appropriate bonding, the force acting on the precursor ceramic cannot be absorbed by the carbon nanotubes. The present invention, however, is able to improve the bonding of the carbon tubes to the precursor ceramic considerably in that the bonding binds the carbon nanotubes to the precursor ceramic in a friction-locked manner.

The bonding to the precursor ceramic is achieved by adjusting the content of free carbon forming in the decomposition of the polymer precursor of the precursor ceramic, i.e., of the elementorganic precursors. For this purpose, an approximately stoichiometric to moderately hypostoichiometric carbon content of the precursor ceramic in the range of, e.g., approximately 15% excess carbon to approximately 50% carbon deficiency, is set by the addition of reactive loading materials or by pyrolysis in a hydrogenous atmosphere. An example carbon content lies in the range of ±5% of the stoichiometric carbon content. This forces a reaction between the precursor ceramic and the carbon nanotubes to the extent that the Si from the SiO matrix reacts with the carbon nanotubes. The resulting good bonding due to the chemical bond created between the carbon nanotubes and the precursor ceramic is responsible for the improvement of the mechanical and thermal properties. This principle may be applied to all precursor ceramics manufactured from carbonaceous elementorganic polymer precursors, e.g., polysiloxane, polycarbosilane, polysiloxane, polysilane, polyborazane and the like.

The above-mentioned properties may be improved by using carbon nanotubes in accordance with the present invention. In contrast to the use of fibers or whiskers, in this case there is no deterioration of structural fineness since the carbon nanotubes, in contrast to whiskers, for example, are smaller than the filler particles.

The quantity of free carbon, as it is produced in the decomposition of the polymer precursors of the precursor ceramic, may be controlled in two ways. On the one hand, suitable reactive loading materials may be added, which suppresses the formation of free carbon or produces a carbon deficiency. This forces the precursor ceramic to bond to the carbon nanotubes. Splitting off gaseous decomposition products frees up valences (free electrons). These valences of the precursor ceramic are the driving force for the reaction with the carbon nanotubes. Suitable loading materials are those that enter into a reaction with a) the oxygen and/or b) with the carbon of the precursor ceramic. In the reaction of the loading materials with the oxygen of the precursor ceramic (case a)), more carbon remains in the precursor ceramic since the carbon takes the place of the oxygen in the precursor ceramic. In the reaction of the loading materials with the carbon of the precursor ceramic (case b)), the formation of free carbon may be prevented or carbon may be extracted from the precursor ceramic.

Al, Si, Fe, Mo, Cr, $SiO_2$, B, V, Ti, Zr, Ni, Cu, Co, for example, or all elements or their compounds that form thermally stable (at least up to 1300° C.) carbon or oxygen compounds may be used as loading materials. In this regard, nanometal powders produced by electrical wire explosion are advantageous since these powders provide a particularly high reactivity already at low temperatures. In this manner, carbon and/or oxygen are extracted from the precursor ceramic at low temperatures during the pyrolysis.

Bonding to the precursor ceramic by the loading material may also be achieved by bridging, which means that particles of the loading material bond on the one side with the precursor ceramic and on the other side with the carbon nanotube. Thus the particle reacts on the one side with the precursor ceramic and on the other side with the carbon nanotube.

In elementorganic precursors, the concentration of free carbon, however, may also be adjusted during the pyrolysis in a defined hydrogenous atmosphere. If the elementorganic precursor, for example, contains methyl groups as carbon source, then the carbon concentration is influenced via the methane gas equilibrium. The higher the hydrogen concentration in the pyrolysis atmosphere, the more the equilibrium of the methane gas reaction $C+2H_2 \rightarrow CH_4$ will be on the product side (methane side).

The high hydrogen concentration prevents the methane/methane radical, which during pyrolysis splits off from the methyl-group-containing elementorganic precursor, from decomposing into hydrogen and carbon, thus allowing it to diffuse out of the precursor ceramic.

Particularly well suited for reinforcing precursor ceramics are so-called multi-wall carbon nanotubes (NWNT). When bonding the precursor ceramic and/or the loading materials to the outer carbon nanotube or nanotubes of the MWNT, the inner carbon nanotubes are preserved.

In addition to reinforcing, carbon nanotubes can also be used to improve the electrical and thermal conductivity of the precursor ceramic. In carbon nanotubes that are dispersed in plastics, percolation already starts at 0.2% by weight.

The following is an example of a composite material for the manufacture of a precursor ceramic reinforced by carbon nanotubes:

| | |
|---|---|
| 50–80% by volume | polysiloxane (contains 0-3% zirconium acetylacetonate by mass) |
| 0-10% by volume | SiC |
| 0-20% by volume | $Al_2O_3$ |
| 0-20% by volume | $MoSi_2$ |
| 0-10% by volume | aluminum |
| 0-20% by volume | carbon nanotubes |

The amount of aluminum required in the composite material is defined by the following interrelationship. During pyrolysis, oxidation extracts oxygen from the precursor ceramics to such an extent that the remaining quantity of the elements Si, O and C, which stem from the polysiloxane, arithmetically can only remain in the precursor ceramic as $SiO_2$ and SiC, and thus arithmetically there can be no free carbon or there is a carbon deficiency. This forces a reaction of the precursor ceramic with the carbon nanotubes.

A detailed exemplary embodiment is provided below.

Step 1: Weighing in Components:

60% polysiloxane by volume (contains 2% zirconium acetylacetate by mass)

7% SiC by volume

19% $Al_2O_3$ by volume

4% $MoSi_2$ by volume

5% aluminum by volume

6% carbon nanotubes by volume

Step 2: Mixing:

The components listed in step 1 are mixed in a high-speed mixer at 1500 $min^{-1}$.

Step 3: Kneading:

The mixture from step 2 is kneaded in the extruder until no agglomerates remain.

Step 4: Molding:

Molding occurs by hot-pressing at 160° C. for 20 minutes.

Step 5: Pyrolysis:

Heating at 100 Kh$^{-1}$ up to 1300° C.; maintaining for 1 hour at 1300° C.; cooling at 300 Kh$^{-1}$ until reaching room temperature.

What is claimed is:

1. A method for manufacturing a precursor ceramic, comprising:

providing a mixture of elementorganic precursor polymers and carbon nanotubes; the elementorganic precursor polymers selected from the group consisting of polysilazanes, polycarbosilanes, polysiloxanes, polysilanes and polyborazanes; and performing a pyrolysis of the mixture of the elementorganic precursor polymers and the carbon nanotubes to form the precursor ceramic, wherein the carbon nanotubes are bonded to the precursor ceramic, the bonding occurring in such a way that the quantity of free carbon forming in decomposition of the elementorganic precursor polymers is adjusted in such a way that a carbon concentration in the precursor ceramic ranges from approximately stoichiometric to moderately hypostoichiometric, wherein the carbon concentration in the precursor ceramic ranges from approximately 15% excess carbon to approximately 50% carbon deficiency.

2. The method as recited in claim 1, wherein the carbon nanotubes include multi-wall carbon nanotubes.

3. The method as recited in claim 1, wherein the carbon concentration in the precursor ceramic is in the range of ±5% of the stoichiometric carbon concentration in the precursor ceramic.

4. The method as recited in claim 1, wherein the quantity of free carbon forming in decomposition of the elementorganic precursor polymers is adjusted by addition of loading materials.

5. The method as recited in one of claim 1, wherein the quantity of free carbon forming in decomposition of the elementorganic precursor polymers is adjusted during the pyrolysis by providing a selected hydrogenous atmosphere for the pyrolysis.

6. The method as recited in claim 4, wherein the loading materials include elements which form one of thermally stable carbon compounds and thermally stable oxygen compounds.

7. The method as recited in claim 6, wherein the thermally stable carbon compounds and thermally stable oxygen compounds are thermally stable up to at least 1300° C.

8. The method as recited in claim 6, wherein the loading materials include at least one of Al, Si, Fe, Mo, Cr, SiO2, B, V, Ti, Zr, Ni, Cu and Co.

9. The method as recited in claim 4, wherein the loading material achieves the bonding by bridging the carbon nanotubes to the precursor ceramic.

* * * * *